United States Patent
Abraham et al.

[19]

[11] Patent Number: 5,865,998
[45] Date of Patent: Feb. 2, 1999

[54] RECEIVER-DRYER ASSEMBLY AND DESICCANT BAG THEREFOR

[75] Inventors: Anthony W. Abraham, Laguna Niguel; Samuel N. Chen, Irvine, both of Calif.

[73] Assignee: Calsonic North America, Inc., Irvine, Calif.

[21] Appl. No.: 680,533

[22] Filed: Jul. 9, 1996

[51] Int. Cl.⁶ .................................................. B01D 27/08
[52] U.S. Cl. ........................ 210/282; 96/131; 96/133; 96/151; 210/284; 210/288; 210/DIG. 6
[58] Field of Search .............................. 96/108, 134, 151, 96/131, 133, 136, 138; 210/282, 283, 284, 288, 484, DIG. 6

[56] References Cited

U.S. PATENT DOCUMENTS

| | | |
|---|---|---|
| 4,111,813 | 9/1978 | Preus ........................................ 210/282 |
| 4,436,623 | 3/1984 | Cullen et al. ............................. 210/282 |
| 5,215,660 | 6/1993 | Mosher et al. ........................... 210/283 |
| 5,575,833 | 11/1996 | Griffin ..................................... 210/282 |

*Primary Examiner*—Ivars Cintins
*Attorney, Agent, or Firm*—Meschkow & Gresham, P.L.C.; Jordan M. Meschkow; Lowell W. Gresham

[57] ABSTRACT

A receiver-dryer for use in an air conditioning system utilizes desiccant bags that can be mounted within the receiver-dryer body without using mounting plates or baffles. The receiver-dryer includes an output tube having a retaining shoulder located thereon. In one embodiment, a desiccant bag includes a rigid eyelet that cooperates with the retaining shoulder to support the desiccant bag. In an alternate embodiment, the desiccant bag is supported by the retaining shoulder via a support washer.

14 Claims, 3 Drawing Sheets

5,865,998

1

RECEIVER-DRYER ASSEMBLY AND DESICCANT BAG THEREFOR

BACKGROUND OF THE INVENTION

1. Field of the Invention

The present invention relates generally to air conditioning systems. More particularly, the present invention relates to receiver-dryers and desiccant bags utilized in air conditioning systems.

2. The Prior Art

Receiver-dryers are employed by air conditioning systems to remove water and to filter impurities from the refrigerants that circulate through the air conditioning systems. Porous bags filled with desiccant matter (desiccant bags) are frequently used to perform contaminant filtration and water absorption in receiver-dryers. Alternatively, at least one known receiver-dryer includes loose particles of desiccant sandwiched between upper and lower filtration plates. Unfortunately, it can be difficult and time consuming to assemble a receiver-dryer that utilizes such prior art desiccant elements.

A conventional receiver-dryer typically includes a hollow body that receives an inward flow of refrigerant and an output tube that carries the treated refrigerant out of the body. In a cylindrical receiver-dryer body, the output tube is centrally positioned such that it extends downward from an output duct located at the top of the body. A donut-shaped desiccant bag resides on the output tube and is located within the body such that the refrigerant passes through the desiccant bag en route to the output tube.

Conventional desiccant bags are formed from porous, flexible fabric and, consequently, they lack an appreciable amount of structural rigidity near their mounting holes and near their peripheral edges. One known receiver-dryer utilizes upper and lower baffles to maintain the desiccant bag (or bags) in a predetermined location along the output tube. In addition, the baffles themselves are secured within the body via snap rings, clips, or other fastening elements. Consequently, such receiver-dryers can be difficult to assemble and the associated manufacturing costs can be undesirably high.

SUMMARY OF THE INVENTION

Accordingly, it is an advantage of the present invention that an improved receiver-dryer for use in an air conditioning system is provided.

Another advantage of the present invention is that an improved desiccant bag for use in a receiver-dryer is provided.

Another advantage is that the present invention provides a receiver-dryer that is easy to manufacture and assemble.

A further advantage of the present invention is that it provides a desiccant bag that can be mounted within a receiver-dryer body without the use of mounting plates.

Another advantage is that a desiccant bag with improved structural rigidity is provided by the present invention.

The above and other advantages of the present invention are carried out in one form by a receiver-dryer assembly having a body defining an interior volume, a refrigerant inlet duct, a refrigerant outlet duct, an outlet tube residing within the interior volume, a desiccant bag located in a refrigerant flow path through the body, and a retaining shoulder located on the outlet tube. The desiccant bag includes a shell formed from a porous material, a mounting hole formed in the shell, desiccant material located within the shell, and a substantially rigid eyelet coupled to the shell and located around the mounting hole. The retaining shoulder cooperates with the eyelet to limit movement of the desiccant bag toward a lower end of the body.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE PREFERRED EMBODIMENTS

Figure 1:
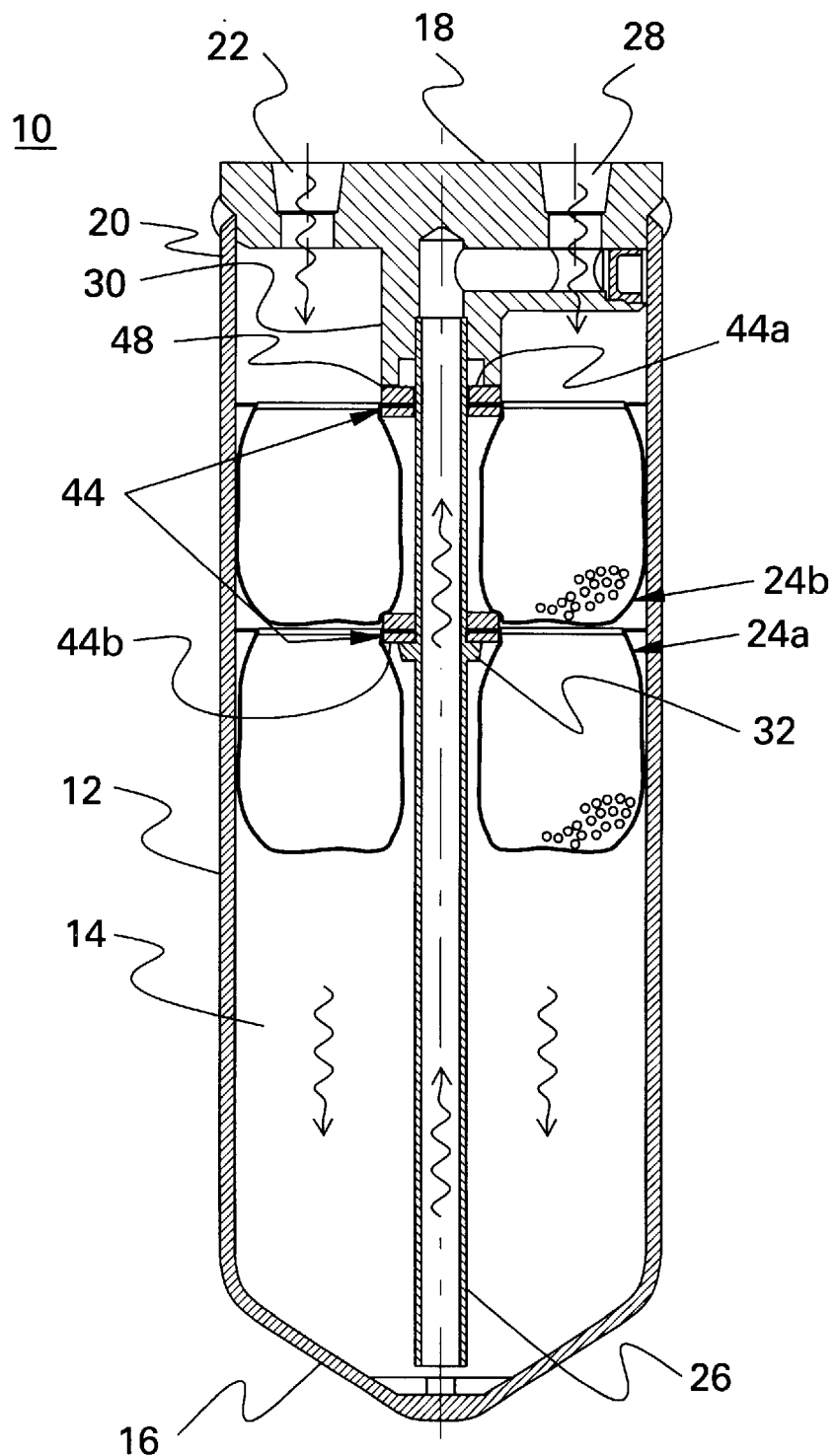
FIG. 1 is a cross sectional view of a receiver-dryer assembly according to a first embodiment of the present invention.

Referring to FIG. 1, a cross sectional view of a receiver-dryer assembly 10 according to a first preferred embodiment of the present invention is illustrated. Receiver-dryer assembly 10 is used in a heat exchanging system, such as an automotive air conditioning system (not shown), to remove water and impurities from the refrigerant that circulates through the system. Receiver-dryers and air conditioning systems in general are well known to those skilled in the art.

Receiver-dryer assembly 10 includes a hollow body 12 defining an interior volume 14 through which refrigerant flows during operation of the air conditioning system. In the preferred embodiment, body 12 is substantially cylindrical with a conically-tapered lower end 16. Body 12 may be formed from any material suitable for carrying the refrigerants and oils typically used in air conditioning systems, e.g., aluminum. A cover plate 18 is located at an upper end 20 of body 12. Cover plate 18 is sealed to body 12 to prevent leakage of the refrigerant.

An inlet duct 22 is formed within cover plate 18 to direct the flow of refrigerant into interior volume 14. The direction of flow is indicated by the arrows in FIG. 1. Inlet duct 22 may be configured to receive any number of conventional fittings for fluid connection to the remainder of the air conditioning system.

In the embodiment shown in FIG. 1, receiver-dryer assembly 10 utilizes two similar desiccant bags 24 through which refrigerant flows during operation of the air conditioning system. Desiccant bags 24 are located in the flow path of the refrigerant through body 12, and are preferably arranged in a stacked relationship within interior volume 14. Desiccant bags 24 are configured to absorb excess water and remove unwanted impurities from the refrigerant. Desiccant bags 24 are described in more detail below.

After the refrigerant passes through desiccant bags 24, it enters an outlet tube 26. Outlet tube 26 is coupled to cover plate 18 and is in fluid communication with an outlet duct 28 formed in cover plate 18. As shown, outlet tube 26 extends from upper end 20 toward lower end 16 and is adapted to centrally reside within interior volume 14. Refrigerant flows upward through outlet tube 26 and into outlet duct 28, which directs the flow of refrigerant out from interior volume 14. As with inlet duct 22, outlet duct 28 may be configured to receive suitable fittings for connection to the air conditioning system.

Outlet tube 26 fits into a receiving block 30 formed within cover plate 18. Receiving block 30 locates outlet tube 26 within interior volume 14, provides structural support to outlet tube 26, and limits movement of desiccant bags 24 toward upper end 20 of body 12. Outlet tube 26 also includes a retaining shoulder 32 that serves to limit movement of desiccant bags 24 toward lower end 16 of body 12. Retaining shoulder 32 is preferably, but need not be, an integral part of outlet tube 26. For example, retaining shoulder 32 may alternatively be a snap ring, a weld bead, or the like.

Figure 2:
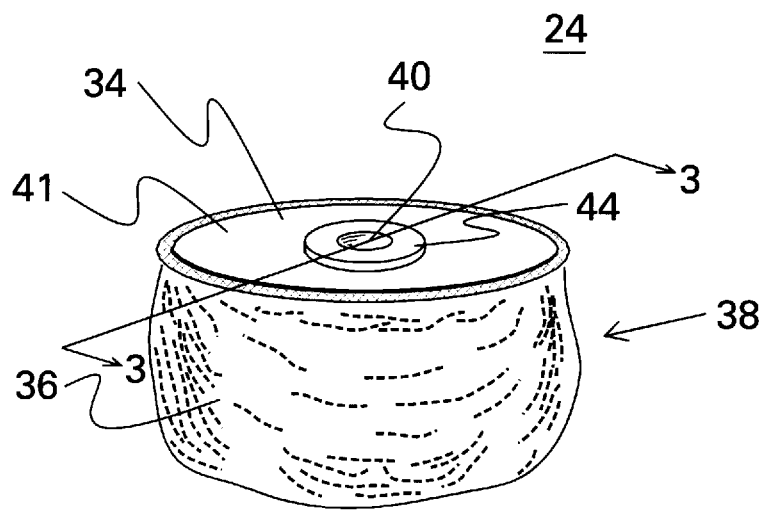
FIG. 2 is a perspective view of a desiccant bag utilized in the receiver-dryer assembly shown in FIG. 1.
Figure 3:
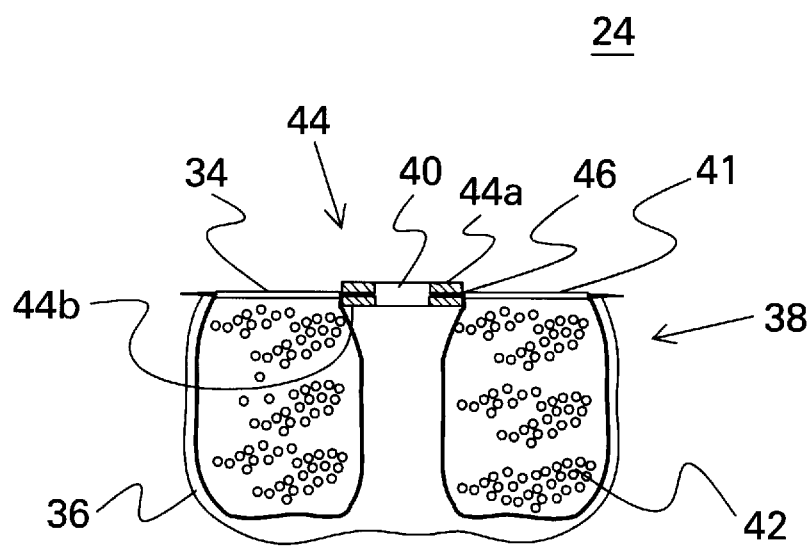
FIG. 3 is a cross sectional view of the desiccant bag viewed from line 3—3 in FIG. 2.

Referring now to FIGS. 2–3, one of desiccant bags 24 is illustrated in detail. Desiccant bag 24 includes a filter lid 34 and a filter bag 36 that together form a shell 38. Shell 38 is formed from a porous material capable of suitably filtering impurities from the refrigerant. In the preferred embodiment, shell 38 is fabricated from flexible polyester felt, and an electrostitch process is employed to affix filter lid 34 to filter bag 36. Of course, desiccant bag 24 may be fabricated from any suitable material and manufactured using various well known techniques.

Filter lid 34 has a mounting hole 40 formed therein, and filter bag 36 is coupled to filter lid 34 around the outer periphery of filter lid 34 and around mounting hole 40. Thus, desiccant bag 24 is approximately donut-shaped. Filter lid 34 has an exposed upper surface 41 that performs initial filtration of the refrigerant as it flows into desiccant bag 24. A quantity of desiccant material 42 is located and maintained within shell 38. Those skilled in the art will appreciate that the specific composition of desiccant material 42 may vary depending upon the type of refrigerant used in the air conditioning system. In the preferred embodiment, desiccant material 42 is granular and the bulk of desiccant bag 24 is pliable and deformable.

In the embodiment shown in FIG. 1, each of desiccant bags 24 includes a substantially rigid eyelet 44 coupled to filter lid 34 and located around mounting hole 40. Eyelet 44 is configured and sized to receive outlet tube 26. Eyelet 44 provides structural rigidity to the area of shell 38 immediately surrounding mounting hole 40. In other words, eyelet 44 is more rigid than adjacent portions of shell 38. Eyelet 44 is preferably fabricated from aluminum, brass, or stainless steel.

As discussed above, filter lid 34 is coupled to filter bag 36 around mounting hole 40. As a result of the preferred electrostitching process, an inner seam 46 (see FIG. 3) is formed around mounting hole 40. Eyelet 44 preferably includes a first portion 44a that resides above inner seam 46 and a second portion 44b that resides below inner seam 46. Consequently, eyelet 44 substantially covers inner seam 46 and reinforces shell 38 near inner seam 46. Eyelet 44 may alternatively be configured as a one-sided element attached to either side of inner seam 46 as necessary for the specific application.

Eyelet 44 is suitably sized such that retaining shoulder 32 supports eyelet 44 and desiccant bag 24 during use. As shown in FIG. 1, retaining shoulder 32 supports a first desiccant bag 24a via second portion 44b of eyelet 44. The outer diameter of eyelet 44 is sized to provide a stable support base for the remainder of first desiccant bag 24a. Thus, retaining shoulder 32 can adequately support first desiccant bag 24a without tearing shell 38.

A second desiccant bag 24b is preferably maintained on outlet tube 26 above first desiccant bag 24a. In the embodiment illustrated in FIG. 1, second desiccant bag 24b is similar to first desiccant bag 24a. Retaining shoulder 32 is positioned on outlet tube 26 such that first desiccant bag 24a supports second desiccant bag 24b proximate upper end 20 of body 12.

As shown in FIG. 1, first portion 44a of eyelet 44 associated with second desiccant bag 24b abuts a lower surface 48 of receiving block 30 when receiver-dryer assembly 10 is in use. As discussed above, receiving block 30 limits movement of second desiccant bag 24b toward upper end 20 of body 12. With respect to second desiccant bag 24b, the outer diameter of first portion 44a of eyelet 44 is approximately equal to, or greater than, the outer diameter of receiving block 30. When the two diameters are approximately equal, eyelet 44 provides a sufficient amount of support between second desiccant bag 24b and receiving block 30 without overly restricting the surface area of filter lid 34 exposed to the flow of refrigerant.

To assemble receiver-dryer assembly 10, desiccant bags 24 are initially placed onto outlet tube 26. Outlet tube 26 is then coupled to receiving block 30 and desiccant bags 24 become sandwiched between retaining shoulder 32 and receiving block 30. Eventually, cover plate 18 is secured to body 12 (as shown in FIG. 1) to locate outlet tube 26 and desiccant bags 24 within body 12. It should be appreciated that receiver-dryer assembly 10 need not employ mounting plates or baffles to support desiccant bags 24 within body 12.

Figure 4:
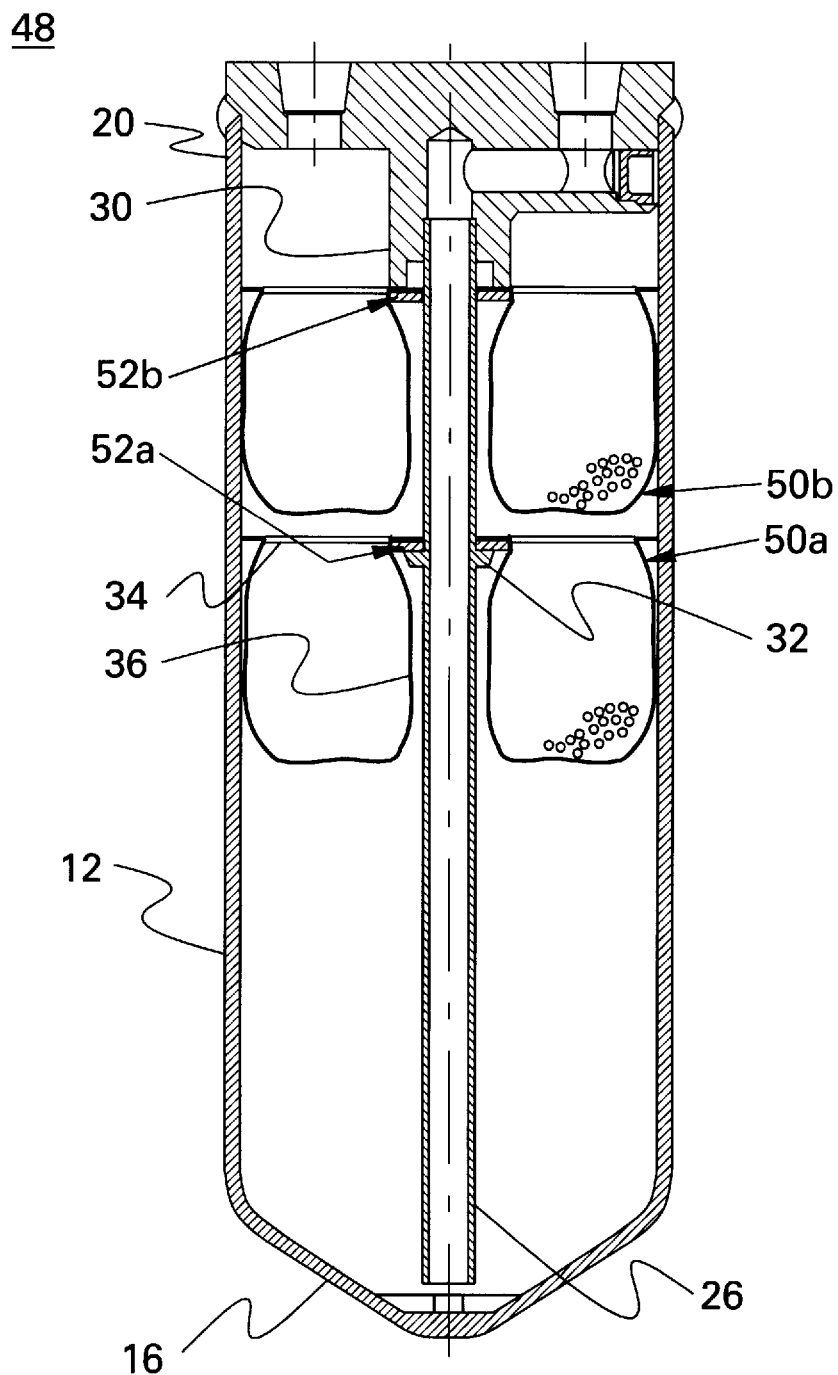
FIG. 4 is a cross sectional view of a receiver-dryer assembly according to a second embodiment of the present invention.

Referring to FIG. 4, a cross sectional view of a receiver-dryer assembly 48 according to a second preferred embodiment of the present invention is illustrated. Receiver-dryer assembly 48 is substantially similar to receiver-dryer assembly 10 described above. However, receiver-dryer assembly 48 employs at least one conventional desiccant bag 50 (i.e., a bag without eyelet 44). Receiver-dryer assembly 48 utilizes support washers 52, rather than desiccant bags 24, to provide support for desiccant bags 50.

Receiver-dryer assembly 48 includes a first support washer 52a located between retaining shoulder 32 and shell 38 of a first desiccant bag 50a. First support washer 52a is configured to support first desiccant bag 50a above lower end 16 of body 12. First support washer 52a allows first desiccant bag 50a to be mounted within body 12 without using a retaining plate and without having to modify first desiccant bag 50a with eyelet 44 (see FIGS. 2–3). When in use, first desiccant bag 50a extends below filter lid 34 and filter bag 36 surrounds first support washer 52a.

A second desiccant bag 50b may also be employed by receiver-dryer assembly 48. A second support washer 52b is preferably located between receiving block 30 and second desiccant bag 50b. Second support washer 52b is positioned on outlet tube 26 such that first desiccant bag 50a supports second desiccant bag 50b. The outer diameter of second support washer 52b is approximately equal to, or greater than, the outer diameter of receiving block 30. When installed properly, second support washer 52b abuts receiving block 30, which limits movement of second desiccant bag 50b toward upper end 20 of body 12. Second support washer 52b prevents inner seam 46 (see FIGS. 2–3) of second desiccant bag 50b from directly contacting receiving block 30. As such, support washer 52b can prevent inner seam 46 from prematurely tearing during use.

In summary, the present invention provides an improved receiver-dryer for use in an air conditioning system and an improved desiccant bag for use in the receiver-dryer. The desiccant bag can be mounted within a receiver-dryer body without the use of mounting plates, therefore a receiver-dryer in accordance with the present invention is easy to manufacture and assemble. In addition, the desiccant bag demonstrates improved structural rigidity over conventional desiccant bags.

The above description is of a preferred embodiment of the present invention, and the invention is not limited to the specific embodiment described and illustrated. For example, a receiver-dryer assembly need not exclusively utilize any specific type of desiccant bag, e.g., a receiver-dryer assembly may utilize one desiccant bag having an eyelet and one conventional desiccant bag in conjunction with a support washer. In addition, a receiver-dryer assembly may include any number of desiccant bags as needed for the specific application. Furthermore, many variations and modifications will be evident to those skilled in this art, and such variations and modifications are intended to be included within the spirit and scope of the invention, as expressed in the following claims.

We claim:

1. A receiver-dryer assembly for use in a heat exchanging system, said receiver-dryer assembly comprising:
    a body defining an interior volume;
    an inlet duct for directing flow of refrigerant into said interior volume;
    an outlet duct for directing flow of refrigerant out from said interior volume;
    an outlet tube in fluid communication with said outlet duct and residing within said interior volume;
    a desiccant bag located in a flow path of said refrigerant through said body, said desiccant bag having:
        a shell formed from a porous material, said shell having a mounting hole formed therein;
        a quantity of desiccant material located within said shell; and
        a substantially rigid eyelet coupled to said shell and located around said mounting hole, said eyelet being configured to receive said outlet tube; and
    a retaining shoulder located on said outlet tube, said retaining shoulder being in contact with said eyelet and configured to support said eyelet to limit movement of said desiccant bag toward a lower end of said body.

2. A receiver-dryer assembly according to claim 1, wherein said shell comprises:
    a filter lid having said mounting hole formed therein and said eyelet coupling to said filter lid; and
    a filter bag coupled to said filter lid around the outer periphery thereof and around said mounting hole to hold said desiccant material therein, said filter bag extending below said filter lid toward said lower end of said body.

3. A receiver-dryer assembly according to claim 2, wherein:
    said filter lid has an exposed upper surface;
    a portion of said eyelet resides below said upper surface; and
    said eyelet is sized such that said retaining shoulder supports said eyelet.

4. A receiver-dryer assembly according to claim 1, further comprising a second desiccant bag maintained on said outlet tube above said desiccant bag, said second desiccant bag comprising:
    a second shell formed from a porous material, said second shell having a second mounting hole formed therein; and
    a second quantity of desiccant material located within said second shell.

5. A receiver-dryer assembly according to claim 4, wherein:
    said inlet duct and said outlet duct are located at an upper end of said body;
    said outlet tube extends from said upper end toward a lower end of said body; and
    said retaining shoulder is positioned on said outlet tube such that said desiccant bag supports said second desiccant bag proximate said upper end.

6. A receiver-dryer assembly according to claim 4, wherein said second desiccant bag further comprises a second substantially rigid eyelet coupled to said second shell and located around said second mounting hole, said second eyelet being configured to receive said outlet tube.

7. A receiver-dryer assembly according to claim 4, further comprising a receiving block that locates said outlet tube within said interior volume, wherein:
    the outer diameter of said second eyelet is approximately equal to or greater than the outer diameter of said receiving block; and
    said retaining shoulder is positioned on said outlet tube such that said desiccant bag supports said second desiccant bag and said second eyelet abuts said receiving block.

8. A receiver-dryer assembly for use in a heat exchanging system, said receiver-dryer assembly comprising:
    a body defining an interior volume;
    an inlet duct for directing flow of refrigerant into said interior volume;
    an outlet duct for directing flow of refrigerant out from said interior volume;
    an outlet tube in fluid communication with said outlet duct and residing within said interior volume;
    a desiccant bag located in a flow path of said refrigerant through said body, said desiccant bag having a shell formed from a porous material, a mounting hole formed in said shell and configured to receive said outlet tube, and a quantity of desiccant material located within said shell;
    a retaining shoulder located on said outlet tube; and
    a support washer located between and in contact with each of said retaining shoulder and said shell, said support washer being configured to support said desiccant bag above a lower end of said body.

9. A receiver-dryer assembly according to claim 8, wherein said shell comprises:
    a filter lid having said mounting hole formed therein; and
    a filter bag coupled to said filter lid around the outer periphery thereof and around said mounting hole to hold said desiccant material therein.

10. A receiver-dryer assembly according to claim 9, wherein said filter bag extends below said filter lid toward said lower end of said body, said filter bag surrounding said support washer.

11. A receiver-dryer assembly according to claim 8, further comprising a second desiccant bag maintained on said outlet tube above said desiccant bag, said second desiccant bag comprising:
    a second shell formed from a porous material, said second shell having a second mounting hole formed therein; and
    a second quantity of desiccant material located within said second shell.

12. A receiver-dryer assembly according to claim 11, wherein:

said inlet duct and said outlet duct are located at an upper end of said body;

said outlet tube extends from said upper end toward a lower end of said body; and said retaining shoulder is positioned on said outlet tube such that said desiccant bag supports said second desiccant bag proximate said upper end.

13. A receiver-dryer assembly according to claim 11, further comprising:

a receiving block that locates said outlet tube within said interior volume; and a second support washer located between said receiving block and said second desiccant bag; wherein:

the outer diameter of said second support washer is approximately equal to or greater than the outer diameter of said receiving block; and said retaining shoulder is positioned on said outlet tube such that said desiccant bag supports said second desiccant bag and such that said second support washer abuts said receiving block.

14. A receiver-dryer assembly according to claim 11, further comprising:

a receiving block that locates said outlet tube within said interior volume;

a substantially rigid eyelet coupled to said second shell and located around said second mounting hole, said eyelet being configured to receive said outlet tube; wherein:

the outer diameter of said eyelet is approximately equal to the outer diameter of said receiving block; and said retaining shoulder is positioned on said outlet tube such that said desiccant bag supports said second desiccant bag and such that said eyelet abuts said receiving block.

\* \* \* \* \*